Oct. 28, 1952     F. G. ANDERSEN     2,615,619
OSCILLATING ELECTRIC FAN AND POWER SUPPLY MEANS THEREFOR
Filed Dec. 27, 1950
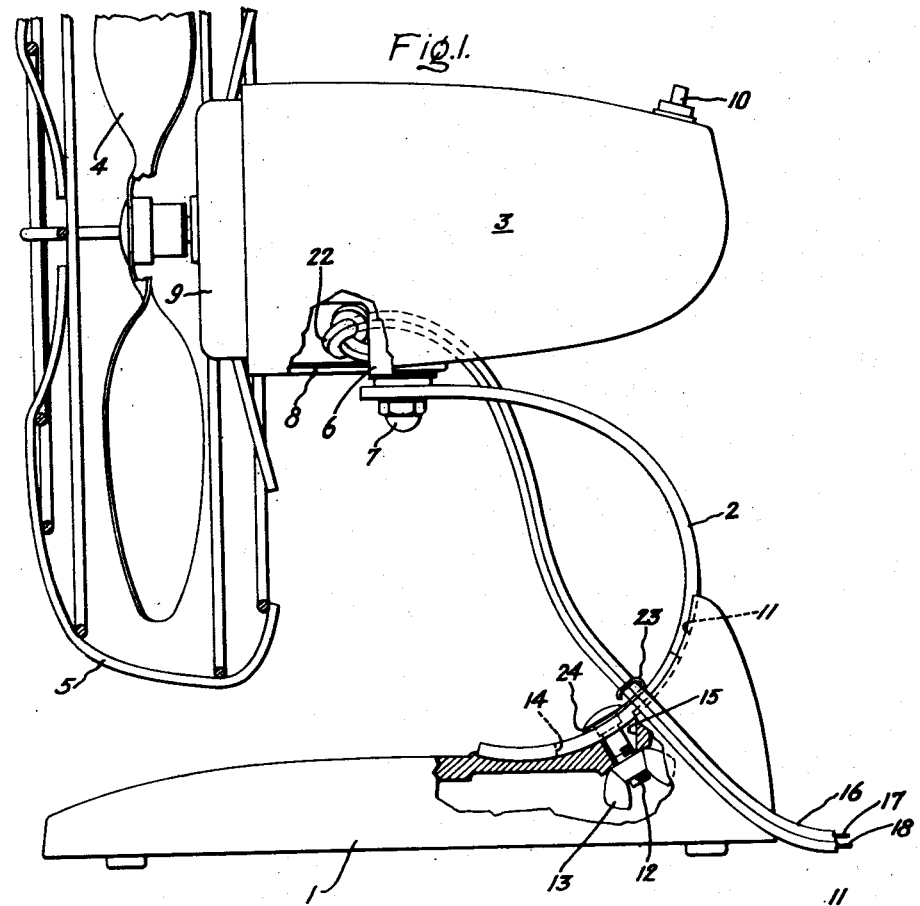
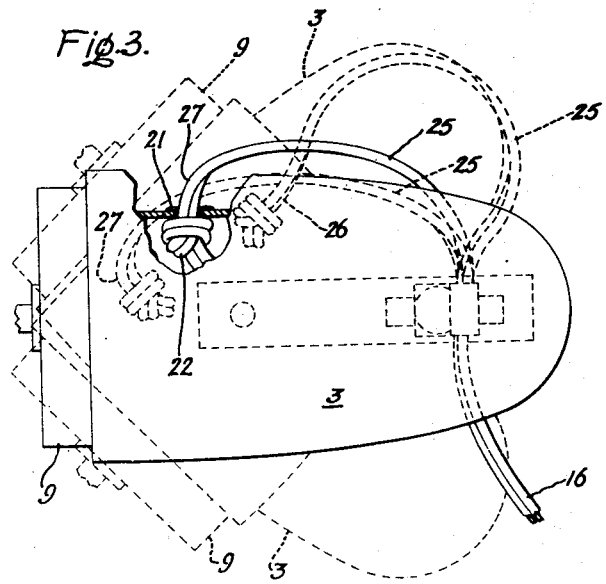
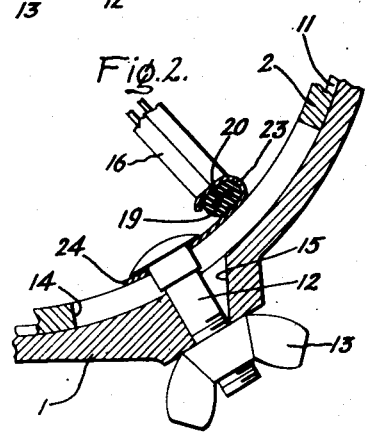
Inventor:
Fred G. Andersen,
by His Attorney.

Patented Oct. 28, 1952

2,615,619

UNITED STATES PATENT OFFICE 2,615,619

OSCILLATING ELECTRIC FAN AND POWER SUPPLY MEANS THEREFOR

Fred G. Andersen, Milford, Conn., assignor to General Electric Company, a corporation of New York Application December 27, 1950, Serial No. 202,895

3 Claims. (Cl. 230—256)

This invention relates to electric fans of the oscillating type, and more particularly to an improved arrangement for electrical power supply to such a fan.

It is an important safety feature in connection with oscillating electric fans to anchor the electrical supply conductors to a non-oscillating portion of the fan, in addition to employing a strain relief means for affixing the conductors to the fan motor. If the conductors are permitted to extend directly to the motor or other movable and periodically oscillating portion of the fan, there is appreciable risk that the user will operate the fan without sufficient play or slack in the power supply cord to permit normal oscillatory movement. Through such inadvertence, the fan may tip itself over upon oscillation, or the power supply cord may be forced to make a sharp bend upon each oscillation resulting in an early cord failure. Obviously, there are further dangers in anchoring the power supply cord only to a movable portion of the fan, such as imposing undue strain on the oscillating mechanism or on the connection between the cord and the fan.

The above difficulties are usually obviated by attaching permanently to the fan base a standard two conductor insulated cord of a type commonly referred to as rip-cord. This cord, extending from a suitable connection plug to the fan base or other non-oscillating portion of the fan, may be of a relatively inexpensive construction since frequent flexing does not occur upon oscillation. Thus, the stranding may comprise relatively few strands of heavier gauge wire, and the insulation may comprise a conventional rubber or suitable substitute covering. However, with high quality long life fans, it has previously been thought essential to employ a special extra flexible multiple conductor insulated cord between the stationary or non-oscillating base of the fan and the constantly oscillating fan motor. For example, the Insulated Power Cable Engineers Association has specified that oscillating fan cord in A. W. G. conductor size 18 should include 165 strands of A. W. G. 40 wires; and similarly, for A. W. G. No. 20 conductors, 104 strands of No. 40 wire should be employed. This may be contrasted with 41 and 26 strands respectively of No. 34 wire for standard hard service cord. In addition, in order to achieve the desired flexibility and long life for such an extra flexible connection between a fan base and its oscillating motor frame, it has been common practice to wrap each bunch stranded conductor with cotton thread before applying the rubber covering. Then each rubber covered conductor carries a silk braiding and finally the two conductors are twisted together and protected by a double cotton braid. With such a construction of the extra flexible cord, it is readily seen that the cost is relatively high, even for the short lengths necessary in this special application. Use of the extra flexible cord between the fan base and the motor additionally requires a connection within the base of the fan to the standard power supply cord.

A primary object of my invention is to eliminate the requirement for the extra flexible cord connection and permit the use of a single continuous power supply cord of standard construction for supplying power to an oscillating fan.

Another object of my invention is to provide an arrangement for anchoring the power supply cord to the fan base, with a portion of the same cord extending to the oscillating portion of the fan.

A further object of my invention is directed to a power supply arrangement for an oscillating electric fan of reduced manufacturing and assembly costs, accompanied with improved operability, trouble-free service, and long life.

In accomplishment of the foregoing objectives, a feature of my invention consists in employing a continuous length of multi-conductor cord extending from a power supply source to the motor of an oscillating fan, with a clip for anchoring the cord to a stationary part of the fan and effective to orient the cord for flexure upon oscillation in arcs of minimum bending stress. Additionally, my invention is featured by a cord attachment to the fan motor and the base which imparts in all oscillatory positions a gradual flexure of the cord without sharp bends.

The features of my invention which I believe to be novel are set forth with particularity in the appended claims. My invention itself, however, together with further objects and advantages thereof, along with its organization and method of operation, may best be understood by reference to the following description taken in connection with the accompanying drawing, in which Fig. 1 is a side elevation, partially in section, of an electric fan embodying my invention; Fig. 2 is an enlarged cross-sectional view of a detail; and Fig. 3 is a top plan view of a portion of the fan shown by Fig. 1, showing different operative positions.

Referring now to the drawing, in Fig. 1 I have shown my invention as embodied in an electric fan having a base 1 for adjustably supporting an arm 2 which swivelly carries the fan power unit indicated generally at 3. The power unit drives a suitable fan blade assembly 4 and additionally powers an oscillating mechanism (not shown). For safety purposes, the fan blade assembly may be enclosed within a wire guard 5 of conventional construction.

While I have not shown any particular oscillating mechanism, it may be understood that the power unit 3 includes a frame 6, serving not only to support the various components of the motor but also as a gear case for the oscillating mechanism. Such a construction is shown in the copending application of George J. Reisch, Serial No. 59,847, filed November 13, 1948, now Patent No. 2,600,325 and assigned to the assignee of the present invention. Frame 6 also provides a suitable bearing for receiving a swivel stud which is fixed to supporting arm 2 by acorn nut 7. An enclosing shell 8 and end cap 9 extending over the frame and motor are desirable for protection of the operating mechanism and for appearance. If desired, a suitable switch 10 for controlling operation of the fan may be secured to shell 8. Thus, it may be seen that the entire power unit 3, fan blade assembly 4, and fan guard 5 are mounted for oscilliatory motion with respect to the fixed supporting arm 2 and base 1.

As shown in Figs. 1 and 2, supporting arm 2 has a generally C shape, with its lower portion arcuate for slidable movement within a track 11 formed in base 1. To hold supporting arm 2 in an adjusted position with respect to the base, I employ a bolt 12 and wing nut 13 therefor extending through an elongated slot 14 in the supporting arm and an aperture 15 in base 1. With this arrangement, wing nut 13 may be loosened to permit sliding movement between supporting arm 2 and base 1, which movement is limited only by the length of elongated slot 14.

In accordance with my invention, I employ a power supply cord 16 consisting of a pair of conductors 17 and 18 covered by suitable insulation 19. Preferably, the insulation surrounding each conductor is joined in a web section 20 which holds the conductors together in parallel spaced relationship. This type of cord is commonly known in the trade as "rip-cord." While insulation 19 may be of any suitable synthetic or natural plastic material with a pliable characteristic, I prefer to employ a synthetic insulation which additionally is not affected by greases and oils employed for lubrication purposes.

As shown in Fig. 3, cord 16 extends into the interior of the fan frame for connection to the motor through an aperture protected by a grommet 21. Within the fan frame, suitable strain relief means are provided, such as the knot 22. Therefore, any strain applied to cord 16 will be taken by this knot and transferred to the frame, without imposing a strain on the terminal connections to the power unit.

As explained above, it is essential in connection with oscillating fans to anchor the power supply cord to a non-oscillating portion of the fan. For this purpose, I employ a sheet metal clip 23 having a U-shaped portion partially encircling and clamping cord 16 and an extending portion 24 apertured to receive bolt 12, whereby this cord clip or clamp may be securely anchored in position to the relatively stationary base 1.

As previously explained, it has heretofore been thought necessary to employ an extra flexible cord of relatively elaborate and expensive construction between the moving and non-moving portions of the fan. However, in accordance with my invention, it is possible to use the same power supply cord between the stationary base and the moving power unit as is employed between the base and the fan plug (not shown). As shown in Figs. 1 and 2, it should be particularly noted that clip 23 is adapted to clamp the cord to the base with the conductors in side by side parallel relation and the minimum or thickness dimension extending outwardly from the base; or, in other words, a flat side of the cord is held against the base. In Fig. 3, I have shown in full lines the intermediate or central position of the fan with respect to supporting arm 2. In dotted lines, I have shown the extreme clockwise and counterclockwise positions occupied by the power unit upon oscillation. From this view, it may be noted that in the extreme clockwise position of oscillation, cord 16 has a primary bend at 25 and a reverse bend at 26. As the fan moves in a counterclockwise direction, the bend at 25 gradually straightens, while the reverse bend at 26 has straightened and then flexed in the opposite direction as at 27. This is the intermediate position as shown in full lines in Fig. 3. As the power unit continues to move in the counterclockwise direction, bend 27 becomes more pronounced, while the curvature of the portion 25 of the cord becomes very slight. Thus upon oscillation, it may be seen that cord 16 has one portion 25, which is repeatedly flexed between a curved or bent position and a substantially straight position; and a second portion which is flexed upon oscillation from a reverse bend 26 to a positive bend 27.

By means of clip 23 and the attachment of the cord to the frame of the power unit, the portion of the cord between the base and the power unit is oriented so that the flexure always occurs on the minimum or thickness dimension of the cord. Otherwise stated, the cord clip 23 assures that the continuously moving portion of the cord is always flexed on its dimension providing maximum flexibility or minimum resistance to bending motion. Furthermore, the insulation 19 on the conductors prevents the bending radius from becoming too sharp.

Prior to adoption of the above described power supply arrangement, an extra flexible cord was employed between the fan base and the oscillating motor frame. In a typical fan, this extra flexible cord consisted of two conductor A. W. G. 20 wire, bunch stranded with 107 strands per conductor of A. W. G. 40 wire, with each conductor insulated with a cotton wrapping, rubber sleeve, and silk braid, and with the two conductors twisted together and protected by a double cotton braid. It was found that the average life of such cord was 1,500,000 flexes with the first break or indication of failure occurring on an average after 550,000 flexes. With my improved construction as described above, I replace the special extra flexible cord with a stranded cord consisting of the conductors, each having 41 strands of A. W. G. 34 wire covered by a $\frac{1}{32}$ inch plastic insulation, with the two conductors connected by a web of the insulation material. Utilizing the same testing procedure, I have found a prolonged average life of 4,950,000 flexes, with the first break or indication of failure occurring after 3,873,000 flexes. Obviously, the power supply cord employed with my improved arrangement can be produced at a fraction of the cost of the special extra flexible cord, in view of the fact that the number of strands has been materially reduced and a single insulating layer is required. Furthermore, a single power supply cord may be used, including the portion extending from the fixed or stationary base to the oscillating motor.

From the foregoing description, it may be seen that I have provided a power supply means for an electric fan of the oscillating type having a longer operative life, while providing a construction of reduced manufacturing cost, both from the standpoint of labor and materials. Also, with this arrangement, a cord may be employed having a greater resistance to abrasion and hard usage. Furthermore, in accordance with my invention, it may be seen that the cord employed relies for its flexibility more upon its orientation with respect to the fan base and motor than it does on its own inherent internal construction.

While the present invention has been described by reference to a particular embodiment thereof, it may be understood that numerous modifications may be made by those skilled in the art without actually departing from the essence of the invention. I, therefore, aim in the appended claims to cover all such equipment variations and modifications as come within the true spirit and scope of the foregoing disclosure.

What I claim as new and desire to secure by Letters Patent of the United States is:

1. In an electric fan, a fan base, a supporting arm mounted on said base, a power unit swivelly carried on said arm for oscillatory movement, a continuous length power supply cord which extends transversely across the supporting arm adjacent to said base and through a side wall of said power unit, said cord being of the type having two flexible conductors extending in parallel spaced relation with insulation covering each conductor and forming a web joining the two conductors in such parallel relation, said cord having its minimum dimension in thickness through one conductor and its corresponding insulation and its maximum dimension in width through both conductors and their insulation including the web, means anchoring said cord to the power unit, and clip means affixing said cord to said arm with its maximum dimension extending lengthwise thereof, there being a length of cord between said clip and anchoring means sufficient to form a loop of substantial size to permit flexing of said cord when the power unit oscillates with respect to said supply arm.

2. In an oscillating electric fan, a base, a supporting arm mounted on the base, a fan power unit swivelly mounted on said supporting arm, a continuous length power supply cord of the type having spaced parallel conductors with insulation covering each conductor which extends transversely across the lower end of said supporting arm and through a side wall of said power unit, a clip fastening said cord to the supporting arm with the conductors in a plane parallel to said arm, and means defining a strain relief connection between said cord and said power unit, there being a length of cord between said clip and said strain relief connection sufficient to form a loop of substantial size to permit flexing of the cord when the power unit oscillates with respect to said supporting arm.

3. In an oscillating electric fan, a base, a supporting arm mounted on the base, a fan power unit swivelly mounted on said arm, a continuous length power supply cord of a type having insulated conductors joined in parallel spaced relation resulting in a cord having a width greater than its thickness which extends from one side of said supporting arm transversely across it and the under side of said power unit and through the far side wall of said power unit, means fastening said cord to said supporting arm with its wide dimension in a plane parallel to said supporting arm, and means anchoring said cord to said power unit, there being a length of cord between said fastening means and said anchoring means of a length to form a loop of a size sufficient to permit of the oscillation of said power unit with respect to said supporting arm.

FRED G. ANDERSEN.

REFERENCES CITED

The following references are of record in the file of this patent:

UNITED STATES PATENTS

| Number | Name | Date |
| --- | --- | --- |
| 1,012,110 | Stowe | Dec. 19, 1911 |
| 1,058,488 | Stowe | Apr. 8, 1913 |
| 2,174,297 | Way | Sept. 26, 1939 |